(12) United States Patent
Norman

(10) Patent No.: US 7,519,293 B1
(45) Date of Patent: Apr. 14, 2009

(54) OPTICAL COMMUNICATION SYSTEM HAVING RING-BASED RESTORATION USING SHARED PROTECT LINKS

(75) Inventor: Charles W. Norman, Lenexa Johnson County, KS (US)

(73) Assignee: Sprint Communications Company LP, Overland Park, KS (US)

( * ) Notice: Subject to any disclaimer, the term of this patent is extended or adjusted under 35 U.S.C. 154(b) by 463 days.

(21) Appl. No.: 11/222,392

(22) Filed: Sep. 8, 2005

(51) Int. Cl.
*G02F 1/00* (2006.01)
*G01R 31/08* (2006.01)

(52) U.S. Cl. ........... 398/5; 398/3; 398/4; 370/222; 370/223

(58) Field of Classification Search ............ 398/50, 398/56, 59, 83, 3, 4, 5; 370/222, 223, 224, 370/258
See application file for complete search history.

(56) References Cited

U.S. PATENT DOCUMENTS

| | | | | |
|---|---|---|---|---|
| 5,282,200 A | * | 1/1994 | Dempsey et al. | 370/245 |
| 6,154,296 A | * | 11/2000 | Elahmadi et al. | 398/83 |
| 6,278,689 B1 | * | 8/2001 | Afferton et al. | 370/223 |
| 6,295,146 B1 | * | 9/2001 | Nathan et al. | 398/50 |
| 6,934,248 B1 | * | 8/2005 | DeBoer et al. | 370/217 |
| 7,158,720 B1 | * | 1/2007 | Mazzurco et al. | 398/4 |
| 2003/0172315 A1 | * | 9/2003 | Grammel | 714/4 |
| 2005/0041601 A1 | * | 2/2005 | Kam et al. | 370/258 |

* cited by examiner

Primary Examiner—M. R. Sedighian

(57) ABSTRACT

In an optical communication system, optical communications are transferred over a first ring and a second ring. A fault is detected on the first ring or the second ring. If the fault is detected on the first ring, a shared optical protect link is used for ring-based restoration of the first ring if the link is available, and restoration overhead for the first ring is transferred in an active location of the shared optical protect link. If the fault is detected on the second ring, the shared optical protect link is used for ring-based restoration of the second ring if the link is available, and restoration overhead for the second ring is transferred in the active location of the shared optical protect link.

20 Claims, 10 Drawing Sheets

OPTICAL COMMUNICATION SYSTEM HAVING RING-BASED RESTORATION USING SHARED PROTECT LINKS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of optical communications, and in particular, to an optical communication system that implements ring-based restoration by using shared protect links.

2. Description of the Prior Art

FIG. 1 illustrates Synchronous Optical Network (SONET) system 100 in an example of the prior art. SONET system 100 includes optical nodes 101-112 and optical spans 121-144 that are coupled together to form optical rings 151-156 as indicated in the following table.

| SPAN | COUPLED NODES | RING |
| --- | --- | --- |
| 121 | 101 & 102 | 151 |
| 122 | 102 & 106 | 151 |
| 123 | 105 & 106 | 151 |
| 124 | 101 & 105 | 151 |
| 125 | 102 & 103 | 152 |
| 126 | 103 & 107 | 152 |
| 127 | 106 & 107 | 152 |
| 128 | 102 & 106 | 152 |
| 129 | 103 & 104 | 153 |
| 130 | 104 & 108 | 153 |
| 131 | 107 & 108 | 153 |
| 132 | 103 & 107 | 153 |
| 133 | 105 & 106 | 154 |
| 134 | 106 & 110 | 154 |
| 135 | 109 & 110 | 154 |
| 136 | 105 & 109 | 154 |
| 137 | 106 & 107 | 155 |
| 138 | 107 & 111 | 155 |
| 139 | 110 & 111 | 155 |
| 140 | 106 & 110 | 155 |
| 141 | 107 & 108 | 156 |
| 142 | 108 & 112 | 156 |
| 143 | 111 & 112 | 156 |
| 144 | 107 & 111 | 156 |

Optical rings 151-156 each represent a Four-Fiber, Bi-directional, Line-Switched Ring (4-fiber BLSR), although other ring configurations, such as a 2-fiber BLSR, could also be used. Optical spans 121-144 each represent four optical fibers—two working fibers that transfer optical communications around the ring in opposite directions, and two protect fibers that provide protection capacity for the working fibers. Note that spans 127 and 137 occupy physical route 120 between optical nodes 106 and 107. Thus, route 120 includes eight optical fibers for two 4-fiber BSLRs.

FIG. 2 illustrates optical nodes 106-107 in an example of the prior art. Optical node 106 includes Add/Drop Multiplexers (ADMs) 201-204, digital cross-connect 209, and optical links 211-214. Optical node 107 includes ADMs 205-208, digital cross-connect 210, and optical links 215-218. Digital cross-connect 209 is coupled to respective ADMs 201-204 over respective optical links 211-214. Digital cross-connect 210 is coupled to respective ADMs 205-208 over respective optical links 215-218. Digital cross-connects 209-210 and optical links 211-218 provide communication capability between the rings. In some cases, the ADMs and cross-connects at a given node are integrated into one system.

ADMs 201-208 are coupled to optical spans 122-123, 126-128, 131-134, 137-138, 140-141, and 144 to form optical rings 151-156 as indicated in the following table.

| ADM | SPAN | RING |
| --- | --- | --- |
| 201 | 122 | 151 |
| 201 | 123 | 151 |
| 202 | 128 | 152 |
| 202 | 127 | 152 |
| 203 | 133 | 154 |
| 203 | 134 | 154 |
| 204 | 137 | 155 |
| 204 | 140 | 155 |
| 205 | 126 | 152 |
| 205 | 127 | 152 |
| 206 | 131 | 153 |
| 206 | 132 | 153 |
| 207 | 137 | 155 |
| 207 | 138 | 155 |
| 208 | 141 | 156 |
| 208 | 144 | 156 |

Physical route 120 includes optical span 127 of optical ring 152 and optical span 137 of optical ring 155. Thus, optical rings 152 and 155 share physical route 120. Optical span 127 includes work lines 219-220 and protect lines 221-222. Optical span 137 includes work lines 223-224 and protect lines 225-226. In this example, each line represents a fiber in a 4-fiber BLSR, although other line/fiber configurations could be used in other examples.

FIG. 3 illustrates physical route 120 in an example of the prior art. Physical route 120 includes optical span 127 having work lines 219-220 and protect lines 221-222. Physical route 120 includes optical span 137 having work lines 223-224 and protect lines 225-226. Work line 219 has a set of STS-1 signals numbered from #1 to #N, where the term STS-1 #1 represents the first STS-1 signal in work line 219 and STS-1 #N represents the Nth STS-1 signal in work line 219. Lines 220-226 have similar STS-1 configurations. The STS-1 #1's in protect lines 221-222 transport restoration overhead in an active location to initiate restoration in the event of a fault on optical ring 152. Likewise, the STS-1 #1's in protect lines 225-226 transport restoration overhead in an active location to initiate restoration in the event of a fault on optical ring 155.

FIG. 4 illustrates protect line 226 in an example of the prior art. Protect line 226 includes STS-1's #1 to #N. STS-1 #1 includes an overhead portion and a payload portion. The overhead portion includes Section Overhead (SOH) and Line Overhead (LOH). The payload portion includes Path Overhead (POH) and user data. The LOH in STS-1 #1 of protect line 226 is the active location for restoration overhead that indicates when protect line 226 is used to restore optical ring 155. The restoration overhead is typically the K1/K2 bytes in the LOH. Although not shown, the LOH in STS-1 #1 of protect lines 221-222 and 225 are the active locations for restoration overhead that indicates when respective protect lines 221-222 and 225 are used to restore their respective optical rings. Note that the LOH of STS-1 #1 transports the restoration overhead. STS-1 #2 to #N are not used for restoration overhead, but rely on the restoration overhead in STS-1 #1. The LOH also has a Data Communication Channel (DCC) that can be used for messages between line entities.

Those skilled in the art are aware that additional systems, such as Wave Division Multiplex (WDM) equipment, may be included in communication system 100, but these additional systems are omitted for clarity.

Referring to FIGS. 1-4, in operation, optical ring 152 transports optical communications using optical spans 125-128 and optical nodes 102-103 and 106-107. Optical ring 155 transports optical communications using optical spans 137-140 and optical nodes 106-107 and 110-111. If ADM 204 detects a fault on optical span 140, then ADM 204 couples work line 223 to protect line 226 and sets the K1/K2 bytes in the LOH of STS-1 #1 on protect line 226 to indicate that protect line 226 is being used to restore optical ring 155. In response to the K1/K2 bytes in STS-1 #1 on protect line 226, ADM 207 couples protect line 226 to a protect line in optical span 138. In response to the K1/K2 bytes in STS-1 #1 on the protect line in optical span 138, optical node 111 couples the protect line in optical span 138 to a protect line in optical span 139. Thus in response to a fault on span 140, optical node 106 transfers communications to optical node 110 over protect lines in spans 137-139, and the restoration is signaled by the K1/K2 bytes in the LOH of STS-1 #1 on these protect lines.

When optical node 110 detects the fault on optical span 140, then optical node 110 couples the affected work line in optical span 139 to a protect line in optical span 139 (going in the opposite direction). Optical node 110 also sets the K1/K2 bytes in the LOH of STS-1 #1 of the protect line to indicate that the protect line in span 139 is being used to restore optical ring 155. In response to the K1/K2 bytes in STS-1 #1 on the protect line in optical span 139, optical node 111 couples the protect line in span 139 to a protect line in span 138 and sets the K1/K2 bytes accordingly. In response to the K1/K2 bytes in STS-1 #1 on the protect line in optical span 138, ADM 207 couples the protect line in optical span 138 to protect line 225 in optical span 137. Thus in response to the fault on span 140, optical node 110 transfers communications to optical node 106 over protect lines in spans 137-139. The K1/K2 bytes in the STS-1 #1 on these protect lines are set to indicate that the protect lines are being used to restore ring 155 from a fault on span 140.

Ring 152 could implement restoration in a similar fashion. For a fault on span 128, protect lines are used to transfer the optical communications from node 106 through nodes 107 and 103 to node 102, and protect lines are used to transfer the optical communications from node 102 through nodes 103 and 107 to node 106 to restore the faulty span 128. The K1/K2 bytes in the STS-1 #1 on these protect lines are set to indicate that the protect lines are being used to restore ring 152 from a fault on span 128.

There are two primary forms of fault restoration in optical networks—ring-based restoration and mesh-based restoration. Ring-based restoration is typically much faster than mesh-based restoration. The faster ring-based restoration provides a better quality-of-service to the communications user. Ring-based restoration is also typically much less complex than mesh-based restoration. Thus, ring-based restoration can be easier for network personnel to understand and manage.

To provide the faster and simpler ring-based restoration, a protect line is needed for each work line in the prior art. Thus, ring-based protection in the prior art does not allow the work lines in the same physical route to share a single protect line. Mesh-based restoration allows protect capacity to be shared, but mesh-based restoration is much slower and far more complex than ring-based restoration. Unfortunately, there is no effective technique to use ring-based restoration while allowing the rings to share protect lines on shared physical routes.

SUMMARY OF THE INVENTION

Examples of the invention include optical communication systems and their methods of operation. In some examples of the invention, an optical communication system comprises a shared optical protect link and an optical node. The optical node is configured to transfer first optical communications over a first optical ring. The optical node is configured to detect a first fault on the first optical ring, and if the first fault is detected, to determine if the shared optical protect link is available for the first optical ring. If the shared optical protect link is available for the first optical ring, the optical node is configured to transfer the first optical communications over the shared optical protect link and to transfer first restoration overhead in an active location of the shared optical protect link to indicate that the first optical ring is using the shared optical protect link for ring-based restoration. The optical node is configured to transfer second optical communications over a second optical ring. The optical node is configured to detect a second fault on the second optical ring, and if the second fault is detected, to determine if the shared optical protect link is available for the second optical ring. If the shared optical protect link is available for the second optical ring, the optical node is configured to transfer the second optical communications over the shared optical protect link and to transfer second restoration overhead in the active location of the shared optical protect link to indicate that the second optical ring is using the shared optical protect link for ring-based restoration.

In some examples of the invention, the optical node is further configured not to use the shared optical protect link to simultaneously restore the first optical ring and the second optical ring.

In some examples of the invention, the optical node comprises a Synchronous Optical Network (SONET) Add/Drop Multiplexer (ADM).

In some examples of the invention, the optical node comprises a digital cross-connect.

In some examples of the invention, the active location comprises the overhead portion of a first STS-1 on the shared optical protect link.

In some examples of the invention, the active location comprises the Line Overhead (LOH) of a first STS-1 on the shared optical protect link.

In some examples of the invention, the active location comprises K1/K2 bytes in a Line Overhead (LOH) of a first STS-1 on the shared optical protect link.

In some examples of the invention, the optical node comprises a Synchronous Optical Network (SONET) Add/Drop Multiplexer (ADM) and a digital cross-connect and wherein the SONET ADM and the digital cross-connect communicate over a SONET Data Communication Channel (DCC) to perform the ring-based restoration.

In some examples of the invention, the optical node is configured to initiate mesh-based restoration for the first ring if the shared optical protect link is not available for the first optical ring when the first fault is detected on the first optical ring, and to initiate mesh-based restoration for the second ring if the shared optical protect link is not available for the second optical ring when the second fault is detected on the second optical ring.

In some examples of the invention, the first ring and the second ring each comprise a four fiber bidirectional line switched ring, and wherein the shared optical protect link comprises a shared protect line.

BRIEF DESCRIPTION OF THE DRAWINGS

The same reference number represents the same element on all drawings.

DETAILED DESCRIPTION OF THE PREFERRED EMBODIMENT

FIGS. 5-10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #1

Figure 1:
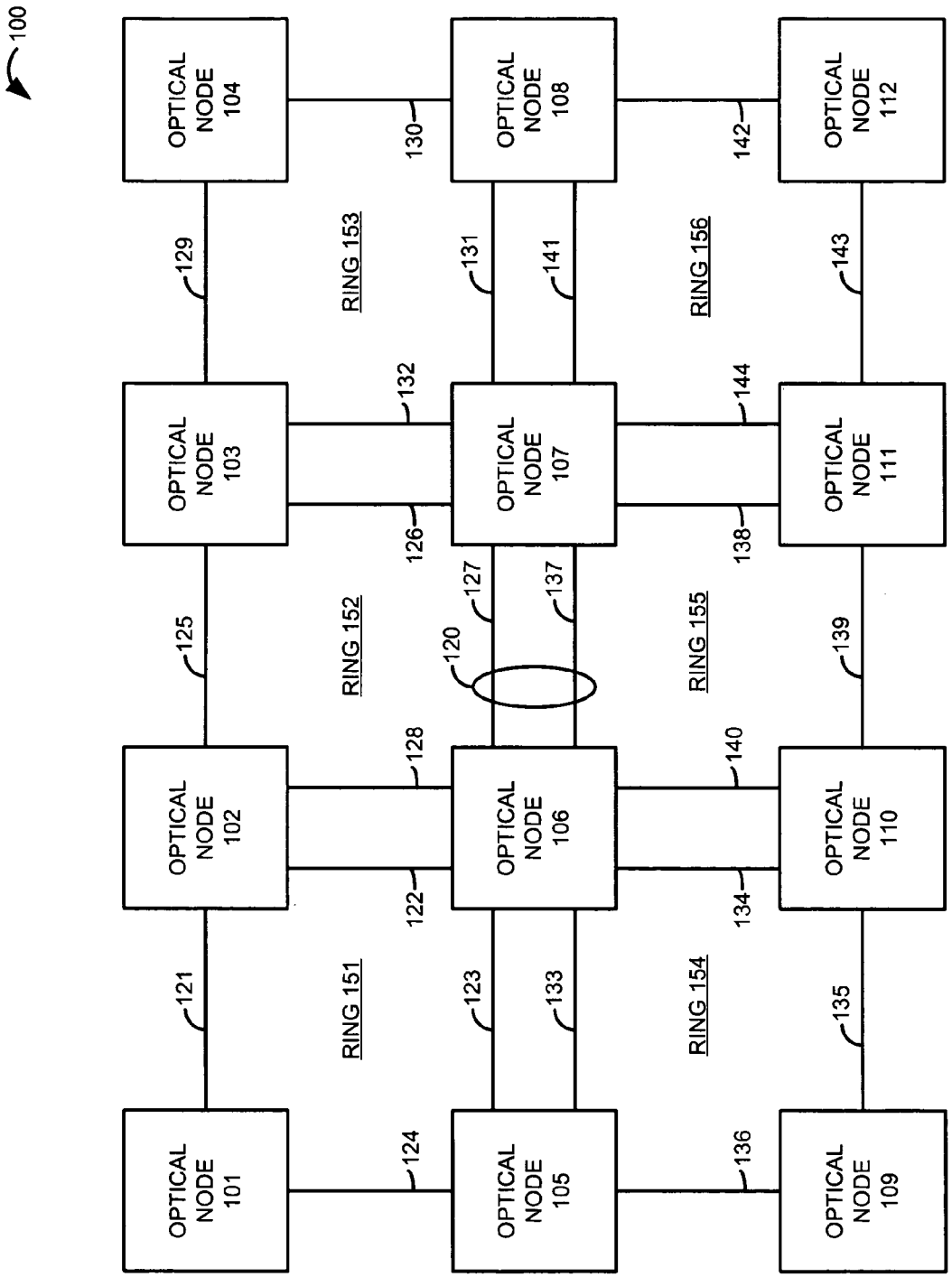
FIG. 1 illustrates an optical communication system in an example of the prior art.
Figure 2:
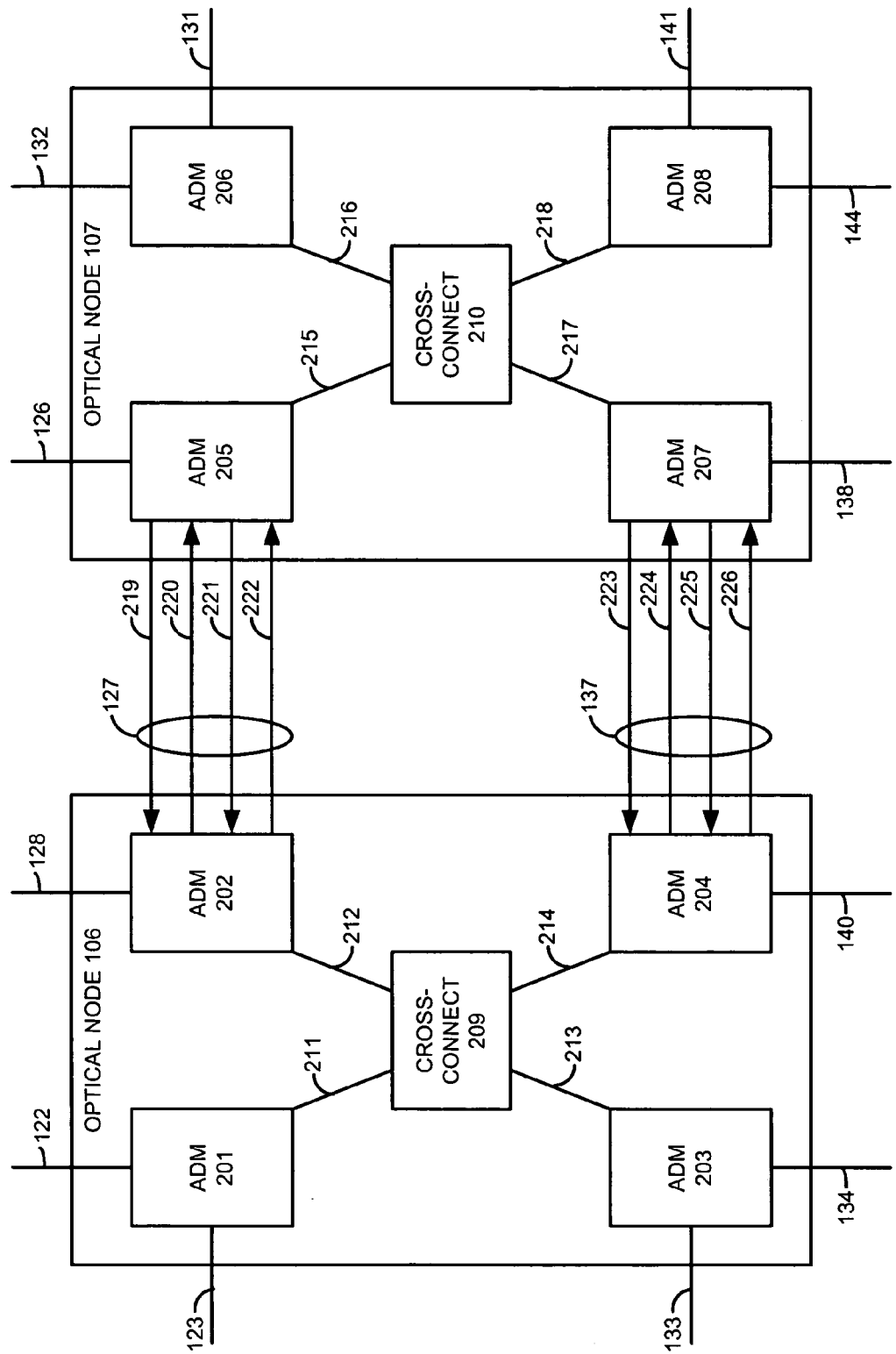
FIG. 2 illustrates optical nodes in an example of the prior art.
Figure 3:
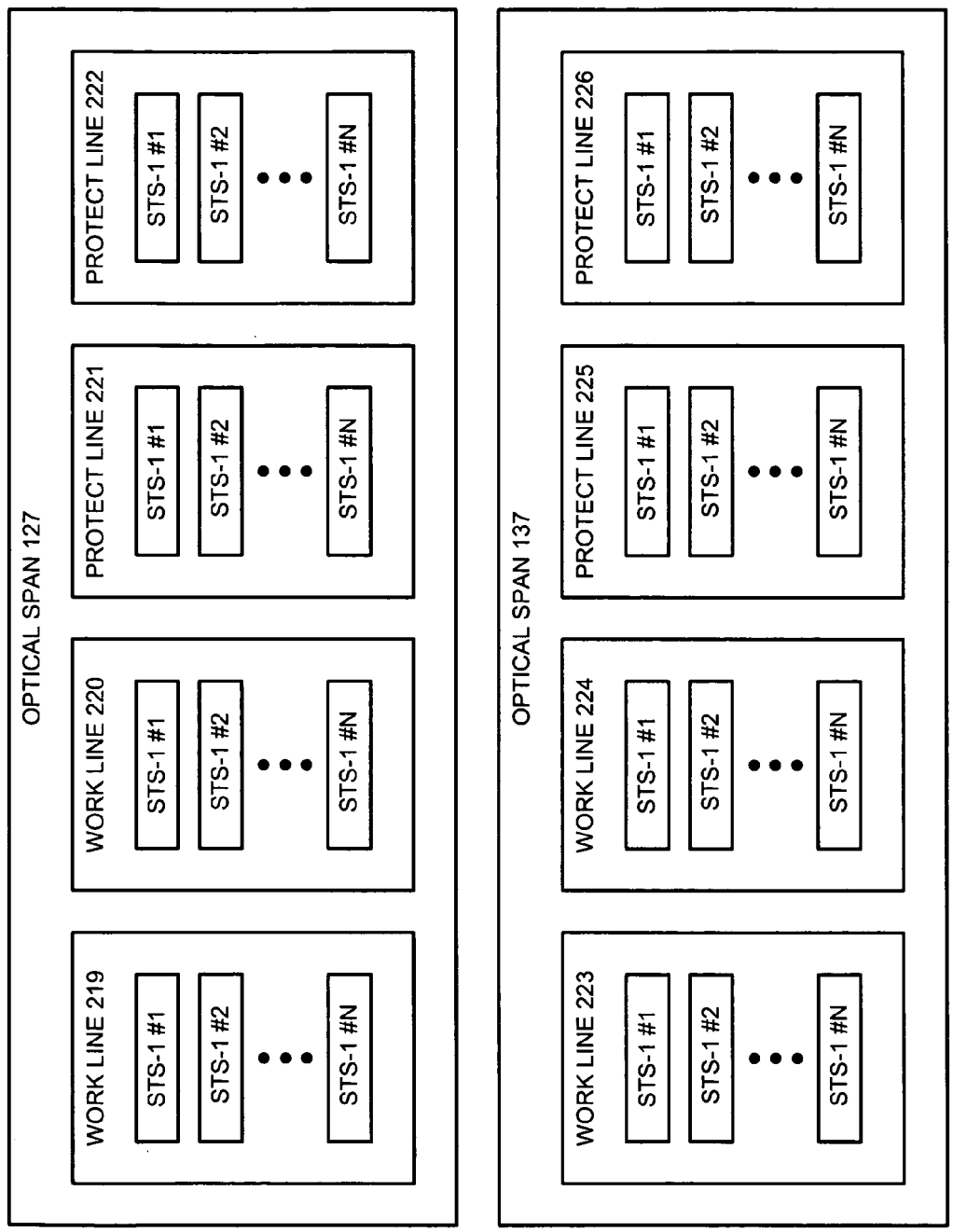
FIG. 3 illustrates a shared physical route in an example of the prior art.
Figure 4:
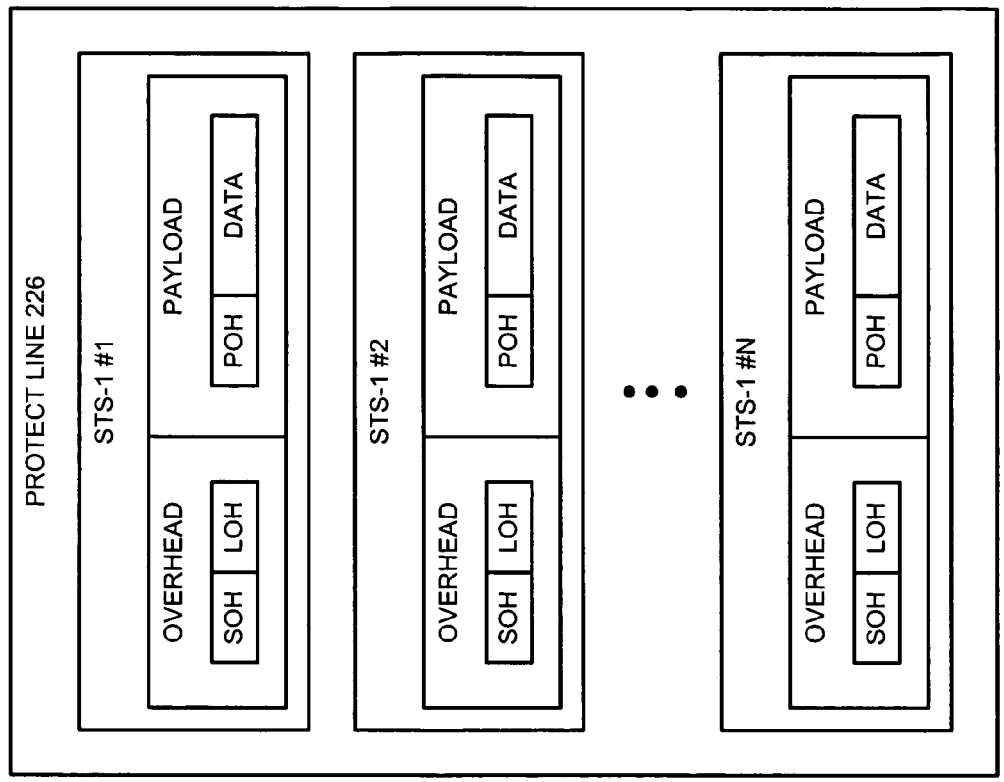
FIG. 4 illustrates a protect line in an example of the prior art.
Figure 5:
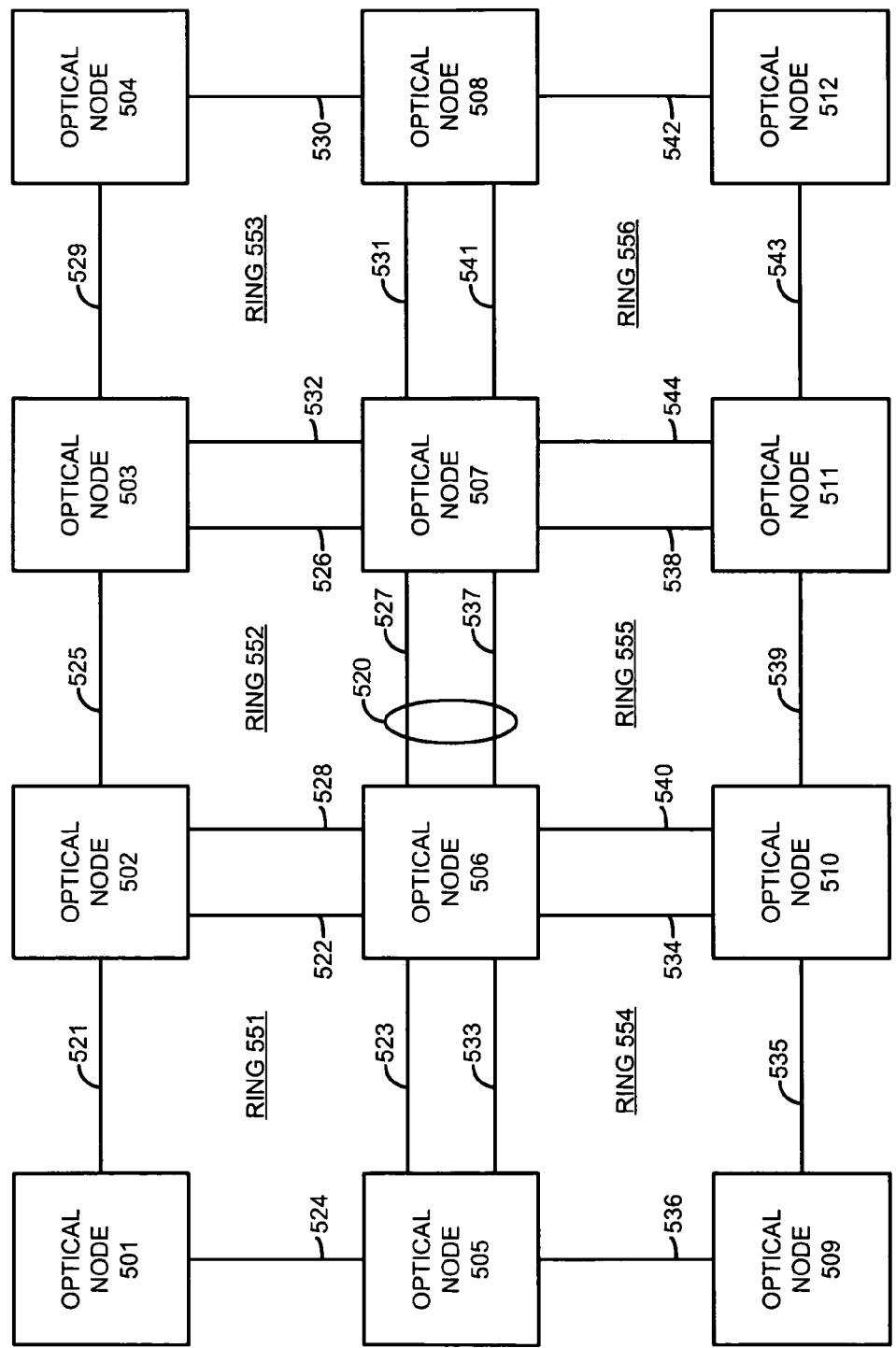
FIG. 5 illustrates an optical communication system in an example of the invention.

FIG. 5 illustrates Synchronous Optical Network (SONET) system 500 in an example of the invention. SONET system 500 includes optical nodes 501-512 and optical spans 521-544 that are coupled together to form optical rings 551-556 as indicated in the following table.

| SPAN | COUPLED NODES | RING |
|---|---|---|
| 521 | 501 &502 | 551 |
| 522 | 502 &506 | 551 |
| 523 | 505 &506 | 551 |
| 524 | 501 &505 | 551 |
| 525 | 502 &503 | 552 |
| 526 | 503 &507 | 552 |
| 527 | 506 &507 | 552 |

-continued

| SPAN | COUPLED NODES | RING |
|---|---|---|
| 528 | 502 &506 | 552 |
| 529 | 503 &504 | 553 |
| 530 | 504 &508 | 553 |
| 531 | 507 &508 | 553 |
| 532 | 503 &507 | 553 |
| 533 | 505 &506 | 554 |
| 534 | 506 &510 | 554 |
| 535 | 509 &510 | 554 |
| 536 | 505 &509 | 554 |
| 537 | 506 &507 | 555 |
| 538 | 507 &511 | 555 |
| 539 | 510 &511 | 555 |
| 540 | 506 &510 | 555 |
| 541 | 507 &508 | 556 |
| 542 | 508 &512 | 556 |
| 543 | 511 &512 | 556 |
| 544 | 507 &511 | 556 |

Note that this example uses 4-fiber BLSRs, although other ring configurations, such as 2-fiber BLSRs could be used in other examples. Also note that optical spans 527 and 537 occupy a common physical route 520 between optical nodes 506 and 507. Optical spans 527 and 537 share protect lines, so only two protect lines are used to protect the four working lines in physical route 520. Thus, the number of protect lines has been reduced by 50% (from four to two) to provide significant cost savings. Likewise, the other physical spans between nodes could also share two protect lines among four work lines to increase the cost savings.

Figure 6:
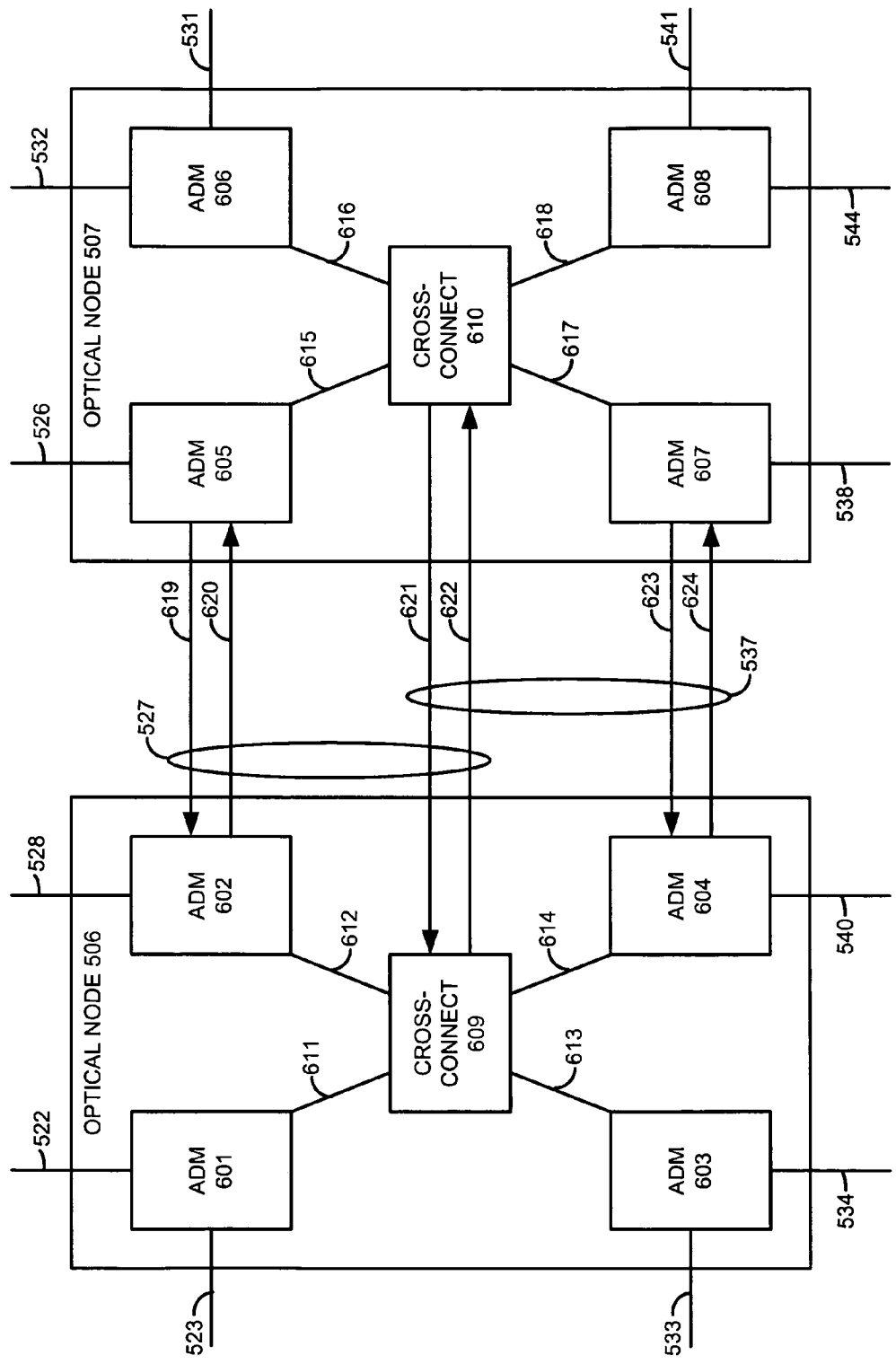
FIG. 6 illustrates optical nodes in an example of the invention.

FIG. 6 illustrates optical nodes 506-507 in an example of the invention. Optical node 506 includes Add/Drop Multiplexers (ADMs) 601-604, digital cross-connect 609, and optical links 611-614. Optical node 507 includes ADMs 605-608, digital cross-connect 610, and optical links 615-618. Digital cross-connect 609 is coupled to respective ADMs 601-604 over respective optical links 611-614. Digital cross-connect 610 is coupled to respective ADMs 605-608 over respective optical links 615-618.

ADMs 601-608 are coupled to optical spans 522-523, 526-528, 531-534, 537-538, 540-541, and 544 to form optical rings 551-556 as indicated in the following table.

| ADM | SPAN | RING |
|---|---|---|
| 601 | 522 | 551 |
| 601 | 523 | 551 |
| 602 | 528 | 552 |
| 602 | 527 | 552 |
| 603 | 533 | 554 |
| 603 | 534 | 554 |
| 604 | 537 | 555 |
| 604 | 540 | 555 |
| 605 | 526 | 552 |
| 605 | 527 | 552 |
| 606 | 531 | 553 |
| 606 | 532 | 553 |
| 607 | 537 | 555 |
| 607 | 538 | 555 |
| 608 | 541 | 556 |
| 608 | 544 | 556 |

Physical route 520 includes optical span 527 of optical ring 552 and optical span 537 of optical ring 555. Thus, optical rings 552 and 555 share physical route 520. Optical span 527 includes work fibers 619-620. Optical span 537 includes work fibers 623-624. Protect lines 621-622 are coupled to cross-connects 609-610. Optical spans 527 and 537 share the same protect lines 621-622. Note that the number of protect lines on the shared route 520 has been reduced by 50% (from four to two) over the number of protect lines on shared route 120 the prior art.

Figure 7:
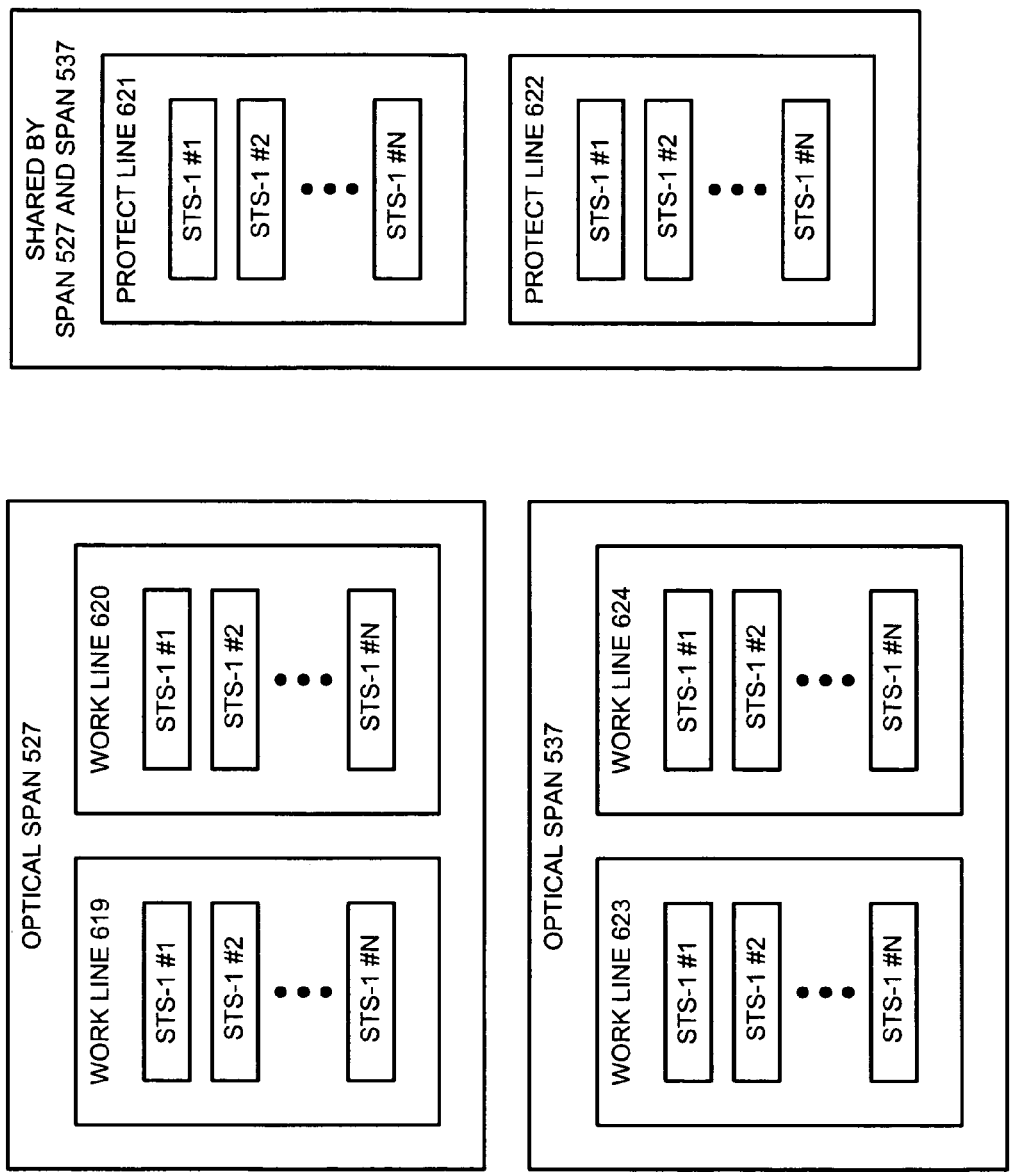
FIG. 7 illustrates a shared physical route in an example of the invention.

FIG. 7 illustrates physical route 520 in an example of the invention. Physical route 520 includes optical span 527 having work lines 619-620, and optical span 537 having work lines 623-624. Optical spans 527 and 537 share protect lines 621-622. Work line 619 has a set of STS-1 signals numbered from #1 to #N, where the term STS-1 #1 represents the first STS-1 signal in work line 619 and STS-1 #N represents the Nth STS-1 signal in work line 619. Lines 620-624 have similar STS-1 configurations. The STS-1 #1's in protect lines 621-622 transport restoration overhead in an active location to signal restoration in the event of a fault on optical ring 552 or 555.

Figure 8:
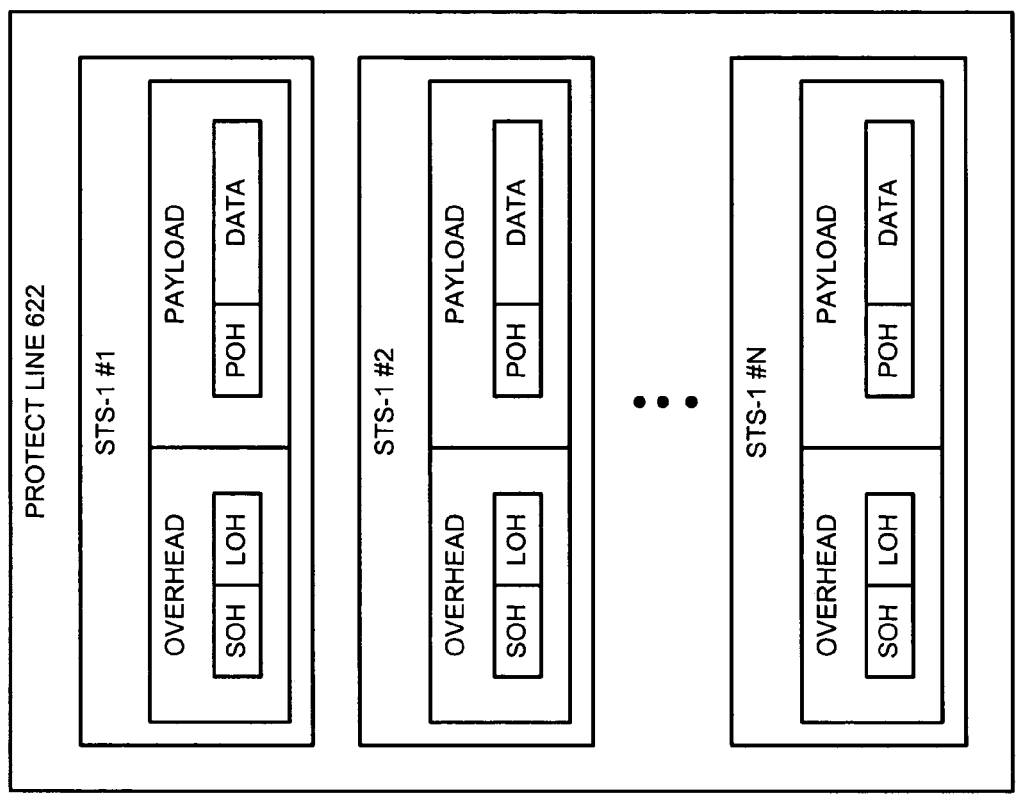
FIG. 8 illustrates a protect line in an example of the invention.

FIG. 8 illustrates protect line 622 in an example of the invention. Protect line 622 includes STS-1's #1 to #N. STS-1 #1 includes an overhead portion and a payload portion. The overhead portion includes Section Overhead (SOH) and Line Overhead (LOH). The payload portion includes Path Overhead (POH) and user data. The LOH in STS-1 #1 of protect line 622 is the active location for restoration overhead that indicates when protect line 622 is used to restore optical ring 552 or 555. The restoration overhead is typically the K1/K2 bytes in the LOH. The LOH in STS-1 #1 of protect line 621 is the active location for restoration overhead that indicates when protect line 621 is used to restore optical ring 552 or 555.

Note that the LOH of STS-1 #1 is the active location that transports the restoration overhead for protect lines 621-622. STS-1 #2 to #N may transport restoration overhead, but they are not an active location for the restoration overhead, and STS-1 #2 to #N rely on the restoration overhead in STS-1 #1 to indicate when respective protect lines 621-622 are used to restore respective ring 552 or 556 from a fault. The active location means that the optical nodes, and the ADMs in particular, will look at the information in that location to control restoration.

Those skilled in the art are aware that additional systems, such as Wave Division Multiplex (WDM) equipment, may be included in communication system 100, but these additional systems are omitted for clarity.

Referring to FIGS. 5-8, in operation, optical ring 552 transports optical communications using optical spans 525-528 and optical nodes 502-503 and 506-507. Optical ring 555 transports optical communications using optical spans 537-540 and optical nodes 506-507 and 510-511. If ADM 604 detects a fault on optical span 540, then ADM 604 and cross-connect 609 couple work line 623 to protect line 622 (using link 614), and ADM 604 sets the K1/K2 bytes in the LOH of STS-1 #1 on protect line 622 to indicate that protect line 622 is being used to restore optical ring 555. In response to the K1/K2 bytes in STS-1 #1 on protect line 622, cross-connect 610 and ADM 607 couple protect line 622 to a protect line in optical span 538 (using link 617). In response to the K1/K2 bytes in STS-1 #1 on the protect line in optical span 538, optical node 511 couples the protect line in optical span 538 to a protect line in optical span 539. Thus, in response to the fault on span 540, optical node 506 transfers communications to optical node 510 over protect lines in spans 537-539, and the K1/K2 bytes in the LOH of STS-1 #1 in these protect lines signal the restoration.

When optical node 510 detects the fault on optical span 540, optical node 510 couples the affected work line in optical span 539 to a protect line in optical span 539 (going the other direction). Optical node 510 also sets the K1/K2 bytes in the LOH of STS-1 #1 of the protect line to indicate that the protect line in span 539 is being used to restore optical ring 555. In response to the K1/K2 bytes in STS-1 #1 on the protect line in optical span 539, optical node 511 couples the protect line in span 539 to a protect line in span 538 and sets the K1/K2 bytes accordingly. In response to the K1/K2 bytes in STS-1 #1 on the protect line in optical span 538, ADM 607 and cross-connect 610 couple the protect line in optical span 538 to protect line 621 in optical span 537 (using link 617). Thus in response to the fault on span 540, optical node 510 transfers communications to optical node 506 over protect lines in spans 537-539. The K1/K2 bytes in the LOH of STS-1 #1 on these protect lines are set to indicate that the protect lines are being used to restore ring 555 from a fault on span 540.

Ring 552 could implement restoration in a similar fashion. For a fault on span 528, protect lines are used to transfer the optical communications from node 502 through nodes 503 and 507 to node 506, and from node 506 through nodes 507 and 503 to node 502. The K1/K2 bytes in the LOH of STS-1 #1 on these protect lines are set to indicate that the protect lines are being used to restore ring 552 from a fault on span 528.

When a protect line is shared by two work lines, the K1/K2 bytes in the LOH of STS-1 #1 of the protect line is also shared by the respective rings. For example, the K1/K2 bytes on STS-1 #1 on protect line 622 could be used to indicate protection for work line 619 on ring 552 or work line 623 on ring 555. Note that in the prior art, each work line has a protect line, so K1/K2 bytes in a protect line are not shared by different rings. Various techniques could be used by the ADMs to share the K1/K2 bytes between two rings.

In one technique, the K1/K2 bytes for a first ring are kept in the LOH of STS-1 #1, and the K1/K2 bytes of the second ring are kept in the LOH of STS-1 #2. If the fault occurs on the first ring, then the K1/K2 bytes for the first ring are already loaded into the active position—the LOH of STS-1 #1. If the fault occurs on the second ring, then the K1/K2 bytes for the two rings are switched, so the K1/K2 bytes for the second ring are loaded into the active position—the LOH of STS-1 #1, and the K1/K2 bytes for the first ring are moved to the LOH of STS-1 #2.

In an alternative scenario, the K1/K2 bytes for a first ring are kept in the LOH of STS-1 #2, and the K1/K2 bytes of the second ring are kept in the LOH of STS-1 #3. Thus, neither ring uses the active position—the LOH of STS-1 #1. If a fault occurs on the first ring, then the K1/K2 bytes for the first ring are moved into active position in the LOH of STS-1 #1. If a fault occurs on the second ring, then the K1/K2 bytes for the second ring are moved into the LOH of STS-1 #1.

To provide restoration, ADMs and cross-connects need to communicate to properly connect work lines and protect lines as described above in the event of a fault. The ADMs would be configured to signal the cross-connect to establish specific work and protect line connections that are required for restoration. The ADMs could communicate with the cross-connects over the SONET Data Communication Channel (DCC). Alternatively, a control channel could be established between ADMs and cross-connects over links 611-618. In some variations, the ADMs and cross-connects are integrated together, so an internal control channel or DCC would be established between ADM and cross-connect sections of the integrated system.

Note that a shared protect line may not be available if simultaneous faults occur in adjacent rings. The occurrence of simultaneous faults in adjacent rings is extraordinarily rare. Back-up mesh protection could be used for restoration in cases where no protect line is available.

Example #2

Figure 9:
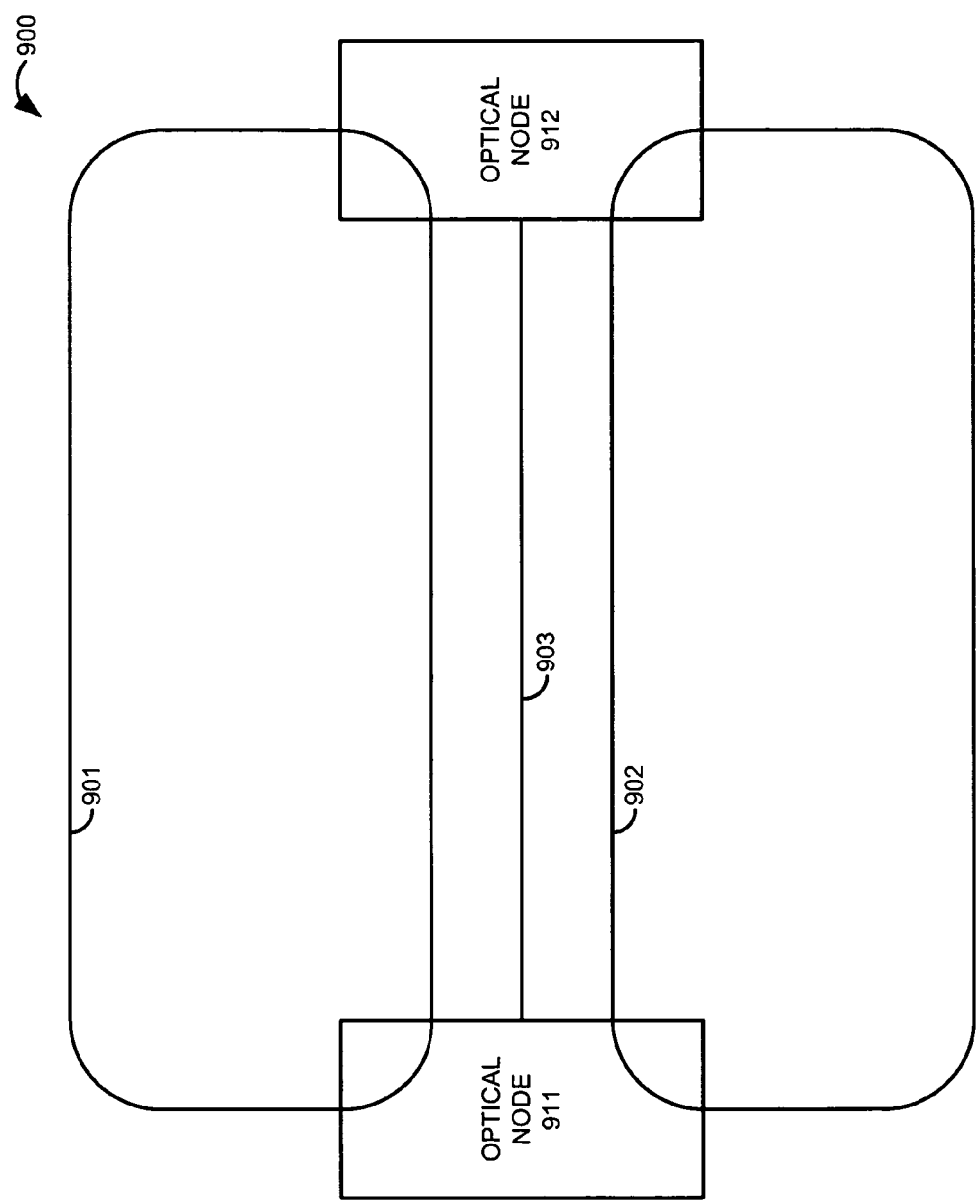
FIG. 9 illustrates an optical communication system in an example of the invention.

FIG. 9 illustrates optical communication system 900 in an example of the invention. Optical communication system 900 includes optical rings 901-902, optical protect link 903, and optical nodes 911-912. Optical nodes 911-912 form a portion of optical rings 901-902. Optical nodes 911-912 are coupled to protect link 903. Optical nodes 911-912 are configured in a similar manner and transfer optical communications over optical rings 901-902.

Figure 10:
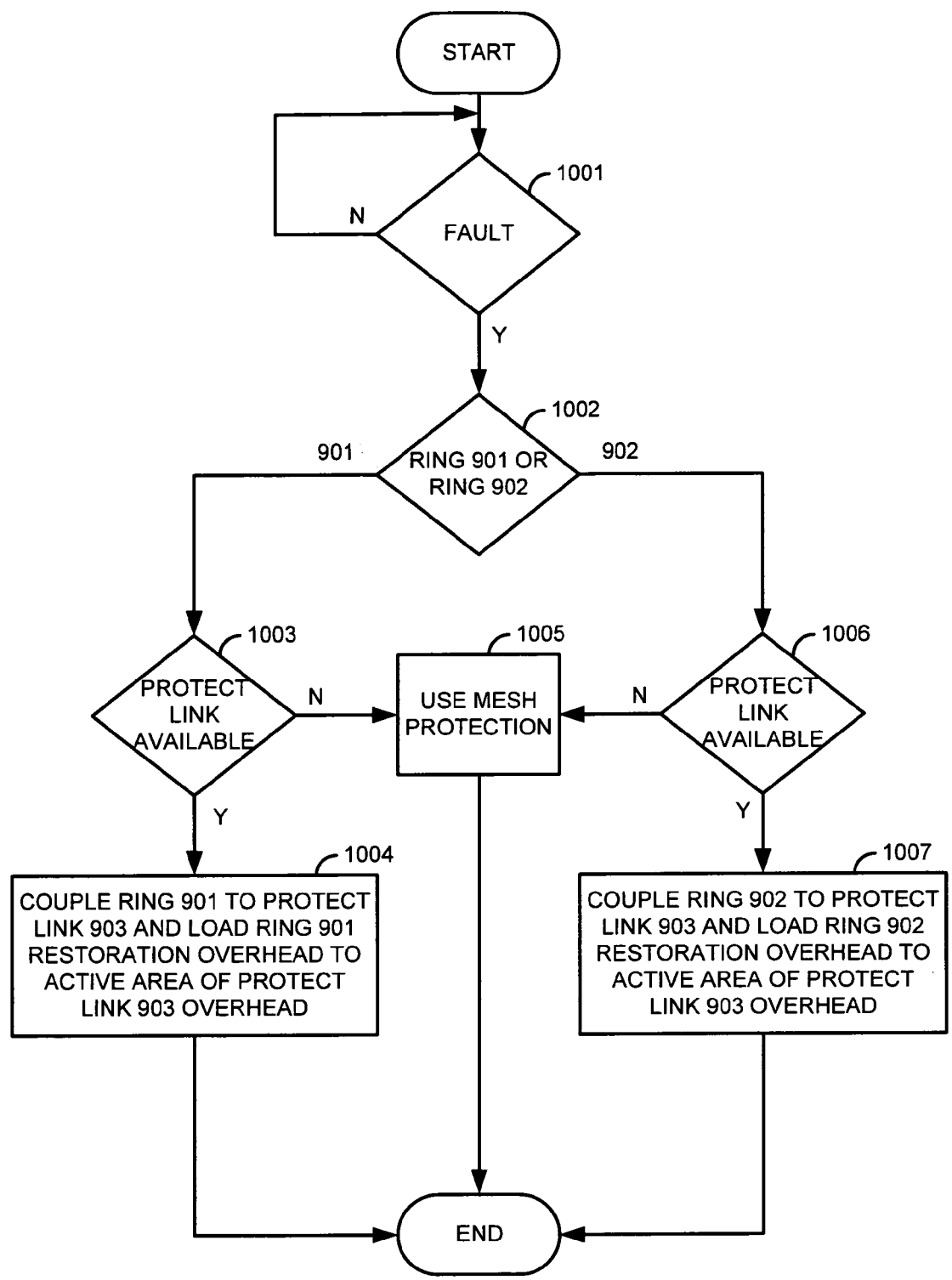
FIG. 10 illustrates optical communication system operation in an example of the invention.

FIG. 10 illustrates restoration for optical communication system 900 in an example of the invention. The reference numbers from FIG. 10 are indicated parenthetically below. Optical node 911 is configured to detect a fault on optical rings 901-902. If optical node 911 detects a fault on ring 901 (steps 1001-1002), optical node 911 determines if optical protect link 903 is available for ring 901 (step 1003). If optical protect link 903 is available for ring 901, then optical node 911 transfers optical communications from ring 901 over optical protect link 903 (step 1004). Optical node 901 also transfers restoration overhead for ring 901 in an active location on protect link 903 to indicate that optical ring 901 is using optical protect link 903 for restoration (step 1004). If optical protect link 903 is not available for ring 901 (step 1003), then optical node 911 initiates mesh protection for ring 901 (step 1005).

If optical node 911 detects a fault on ring 902 (steps 1001-1002), optical node 911 determines if optical protect link 903 is available for ring 902 (step 1006). If optical protect link 903 is available for ring 902, then optical node 911 transfers optical communications from ring 902 over optical protect link 903 (step 1007). Optical node 901 also transfers restoration overhead for ring 902 in the active location for protect link 903 to indicate that optical ring 902 is using optical protect link 903 for restoration (step 1007). If optical protect link 903 is not available for ring 902 (step 1006), then optical node 911 initiates mesh protection for ring 902 (step 1005).

ADVANTAGES

The optical communication systems described in the above examples provide ring-based restoration while sharing protect capacity. Ring-based restoration is typically faster than meshed-based restoration. Thus, ring based-restoration provides a better quality-of-service to the communication user. Ring-based restoration is also typically much less complex than mesh-based restoration. Thus, ring-based restoration can be easier for network personnel to understand and manage.

The optical communication systems described in the above examples also share protect capacity, and thus, these systems does not require a protect line for each work line as in the prior art. This sharing of protect lines allows a significant reduction in amount of protect capacity required to the faster and simpler provide ring-based restoration. The significant reduction in protect capacity provides a significant reduction in cost. Thus, the optical communication systems described above offer the speed and simplicity benefits of ring-based restoration, while offering significant cost savings over the prior art optical systems that use ring based restoration.

I claim:

1. An optical communication system comprising:
a shared optical protect link; and
an optical node, the optical node configured:
to transfer first optical communications over a first optical ring and to transfer second optical communications over a second optical ring;
to detect a first fault occurring on the first optical ring;
to detect a second fault occurring on the second optical ring;
to determine if the shared optical protect link available for restoration for the first optical ring or for the second optical ring; and
if the first fault is detected and if the shared optical protect link is available for restoration for the first optical ring, to transfer a first restoration overhead from a first signal of the shared optical protect link to an active location of the shared optical protect link, to transfer the first restoration overhead in the active location of the shared optical protect link to indicate that the first optical ring is using the shared optical protect link for ring-based restoration, and to transfer the first optical communications over the shared optical protect link; and
if the second fault is detected and if the shared optical protect link is available for restoration for the second optical ring, to transfer a second restoration overhead from a second signal of the shared optical protect link to the active location of the shared optical protect link, to transfer second restoration overhead in the active location of the shared optical protect link to indicate that the second optical ring is using the shared optical protect link for ring-based restoration, and to transfer the second optical communications over the shared optical protect link.

2. The optical communication system of claim 1 wherein the optical node is further configured not to use the shared optical protect link to simultaneously restore the first optical ring and the second optical ring.

3. The optical communication system of claim 1 wherein the optical node comprises a Synchronous Optical Network (SONET) Add/Drop Multiplexer (ADM).

4. The optical communication system of claim 1 wherein the optical node comprises a digital cross-connect.

5. The optical communication system of claim 1 wherein the active location comprises the overhead portion of a first STS-1 on the shared optical protect link.

6. The optical communication system of claim 1 wherein the active location comprises the Line Overhead (LOH) of a first STS-1 on the shared optical protect link.

7. The optical communication system of claim 1 wherein the active location comprises K1/K2 bytes in a Line Overhead (LOH) of a first STS-1 on the shared optical protect link.

8. The optical communication system of claim 1 wherein the optical node comprises a Synchronous Optical Network (SONET) Add/Drop Multiplexer (ADM) and a digital cross-connect and wherein the SONET ADM and the digital cross-connect communicate over a SONET Data Communication Channel (DCC) to perform the ring-based restoration.

9. The optical communication system of claim 1 wherein the optical node is configured to initiate mesh-based restoration for the first ring if the shared optical protect link is not available for restoration for the first optical ring when the first fault is detected on the first optical ring, and to initiate mesh-based restoration for the second ring if the shared optical protect link is not available for restoration for the second optical ring when the second fault is detected on the second optical ring.

10. The optical communication system of claim 1 wherein the first ring and the second ring each comprise a four fiber bidirectional line switched ring, and wherein the shared optical protect link comprises a shared protect line.

11. A method of operating an optical communication system, the method comprising:

transferring first optical communications over a first optical ring and transferring second optical communications over a second optical ring;

detecting a fault on one of the first optical ring and the second optical ring;

if the fault is detected on the first optical ring, determining if a shared optical protect link is available for restoration for the first optical ring, and if the shared optical protect link is available for restoration for the first optical ring, transferring a first restoration overhead from a first signal of the shared optical protect link to an active location of the shared optical protect link, transferring the first restoration overhead in the active location of the shared optical protect link to indicate that the first optical ring is using the shared optical protect link for ring-based restoration, and transferring the first optical communications over the shared optical protect link and; and if the fault is detected on the second ring, determining if the shared optical protect link is available for restoration for the second optical ring, and if the shared optical protect link is available for restoration for the second optical ring, transferring a second restoration overhead from a second signal of the shared optical protect link to an active location of the shared optical protect link, transferring the second restoration overhead in the active location of the shared optical protect link to indicate that the second optical ring is using the shared optical protect link for ring-based restoration, and transferring the second optical communications over the shared optical protect link.

12. The method of claim 11 the shared optical protect link is not used to simultaneously restore the first optical ring and the second optical ring.

13. The method of claim 11 wherein transferring the first optical communications and the second optical communications comprises using a Synchronous Optical Network (SONET) Add/Drop Multiplexer (ADM).

14. The method of claim 11 wherein transferring the first optical communications and the second optical communications comprises using a digital cross-connect.

15. The method of claim 11 wherein the active location comprises the overhead portion of a first STS-1 on the shared optical protect link.

16. The method of claim 11 wherein the active location comprises the Line Overhead (LOH) of a first STS-1 on the shared optical protect link.

17. The method of claim 11 wherein the active location comprises K1/K2 bytes in a Line Overhead (LOH) of a first STS-1 on the shared optical protect link.

18. The method of claim 11 wherein transferring the first optical communications or the second optical communications over the shared optical protect link comprises communicating between a Synchronous Optical Network (SONET) Add/Drop Multiplexer (ADM) and a digital cross-connect over a SONET Data Communication Channel (DCC) to perform the ring-based restoration.

19. The method of claim 11 further comprising initiating mesh-based restoration for the first ring if the shared optical protect link is not available for restoration for the first optical ring when the fault is detected on the first optical ring, and initiating mesh-based restoration for the second ring if the shared optical protect link is not available for restoration for the second optical ring when the fault is detected on the second optical ring.

20. The method of claim 11 wherein the first ring and the second ring each comprise a four fiber bidirectional line switched ring, and wherein the shared optical protect link comprises a shared protect line.

* * * * *